United States Patent
Lachwani et al.

(10) Patent No.: US 9,128,703 B1
(45) Date of Patent: Sep. 8, 2015

(54) PROCESSOR THAT TRANSITIONS TO AN IDLE MODE WHEN NO TASK IS SCHEDULED TO EXECUTE AND FURTHER ENTERS A QUIESCENT DOZE MODE OR A WAIT MODE DEPENDING ON THE VALUE OF A REFERENCE COUNTER

(75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 1439 days.

(21) Appl. No.: 12/261,980

(22) Filed: Oct. 30, 2008

(51) Int. Cl.
  *G06F 1/00* (2006.01)
  *G06F 1/26* (2006.01)
  *G06F 1/32* (2006.01)

(52) U.S. Cl.
  CPC .................... *G06F 1/3203* (2013.01)

(58) Field of Classification Search
  CPC .................................................. G06F 1/3203
  USPC ........................................................ 713/323
  See application file for complete search history.

(56) References Cited

U.S. PATENT DOCUMENTS

| | | | | |
|---|---|---|---|---|
| 4,766,548 A * | 8/1988 | Cedrone et al. | ............... | 700/236 |
| 6,088,762 A * | 7/2000 | Creta | ............... | 711/106 |
| 6,243,819 B1 * | 6/2001 | Jung | ............... | 713/320 |
| 2003/0188212 A1 * | 10/2003 | Kahn et al. | ............... | 713/323 |
| 2003/0196127 A1 * | 10/2003 | Olsen | ............... | 713/300 |
| 2004/0143734 A1 * | 7/2004 | Buer et al. | ............... | 713/153 |
| 2005/0081246 A1 * | 4/2005 | Barrett et al. | ............... | 725/105 |
| 2005/0193243 A1 * | 9/2005 | Tu et al. | ............... | 714/11 |
| 2008/0081656 A1 * | 4/2008 | Hiles | ............... | 455/550.1 |
| 2010/0287396 A1 * | 11/2010 | Barth et al. | ............... | 713/323 |

* cited by examiner

*Primary Examiner* — Thomas Lee
*Assistant Examiner* — Robert Cassity
(74) *Attorney, Agent, or Firm* — Sutherland Asbill & Brennan LLP (57) ABSTRACT

A quiescent doze mode permits significant reductions in power consumption and dissipation by electronic devices while idle without producing adverse latencies to users. Device drivers communicate predictions as to future use of their coupled devices with a kernel. The kernel may then enter a quiescent doze mode comprising gating clocks on the processor and peripherals, disabling interrupts, and executing a wait for interrupt. Dynamically increasing timer interrupt intervals to significant fractions or multiples of a second further increases the percentage of time the device remains in quiescent doze mode.

20 Claims, 6 Drawing Sheets

PROCESSOR THAT TRANSITIONS TO AN IDLE MODE WHEN NO TASK IS SCHEDULED TO EXECUTE AND FURTHER ENTERS A QUIESCENT DOZE MODE OR A WAIT MODE DEPENDING ON THE VALUE OF A REFERENCE COUNTER

BACKGROUND

Electronic devices such as electronic book readers ("e-book readers"), cellular telephones, portable media players, desktop computers, laptops, tablet computers, netbooks, personal digital assistants, and the like, rely on electrical power to function.

Within these electronic devices, several components utilize significant amounts of power during operation, including the processor(s) and peripheral devices. These peripheral devices include external memory interfaces (EMIs), Universal Serial Bus (USB) controllers, image processing units (IPUs), and so forth. These peripheral devices may reside on the same "chip" or die as the processor, be on another die, or a combination.

A processor not actively in use, but idling, continues to consume significant quantities of power. This idling wastes energy as well as increasing the amount of heat dissipated by the electronic device. Reducing power consumption increases the usable time for a portable device operating from a battery. Reducing power consumption also reduces the heat dissipated by the electronic device, allowing it to operate at a cooler temperature and thus increasing the life of the equipment and simplifying design for cooling.

Various schemes have been put forth to reduce power consumption in portable consumer devices by placing the processor of the device and the peripherals into a "doze" mode. Typically, entering the doze mode involves turning off unused portions of the circuit and/or reducing clock speed of the microprocessor.

However, the techniques used to enter the doze mode introduce unacceptable latencies to execution of commands upon resumption of normal activity. Additionally, recurrent timer interrupts often prevent a device from entering doze mode, or from remaining in doze mode long enough to realize a meaningful reduction in power consumption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, electronic devices utilize low power modes to reduce power consumption and heat dissipation. The electronic devices may be electronic book readers ("e-book readers"), cellular telephones, portable media players, desktop computers, laptops, tablet computers, netbooks, personal digital assistants, and the like.

Existing low power modes such as "doze" mode may result in unacceptable latencies to execution. Even when doze mode is available, doze mode may remain underutilized when recurrent timer interruptions prevent a device from entering doze mode or remaining in that mode for significant fractions of time. Furthermore, existing device drivers do not provide an easy to implement and effective method for predicting use, and communicating the prediction, to an operating system kernel which may then proactively determine when to drop into a lower power mode.

Disclosed is a method and system for leveraging and enhancing doze mode to enter a new low power mode termed "quiescent doze mode" (QDM). QDM may be accessed by an electronic device utilizing a processor capable of gating clocks discretely, providing a wait for interrupt mode, exhibiting low latency for entering and exiting a doze mode, and supporting on demand timers. Gating is the ability to shutdown a selected portion or portions of a circuit. Low latency for entering and exiting a doze mode is considered about 1 nanosecond to at most about 3 microseconds. For example, the i.MX architecture from Freescale™ Semiconductor Incorporated, of Austin, Tex., United State of America, is one suitable family of processors.

The processor executes an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks®.

For example, an e-book reader may incorporate a Freescale™ processor having an i.MX architecture and executing a Linux® kernel. The kernel uses device drivers to communicate with peripheral devices such as external memory interfaces (EMIs), Universal Serial Bus (USB) controllers, image processing units (IPUs), and so forth. These peripheral devices may reside on the same "chip" or die as the processor as in the case of the i.MX architecture, be on another die, or a combination of the two.

The processor transitions into an idle mode when no tasks are scheduled to run immediately, or when the tasks are not scheduled to run for a predetermined time. The kernel dynamically sets a timer interrupt interval on the processor based on when the next task demands execution. This timer interrupt interval may vary from at least a minimum threshold for immediacy, such as about 5 milliseconds (ms), to a value of at most about 1000 ms. In typical use, this method results in an average timer interrupt interval of about 250 ms which provides a good compromise in an e-book reader, and provides the processor with time to reach lower power modes. To illustrate, instead of the processor generating a timer interrupt every 10 ms, which is 100 interrupts per second, at an average timer interrupt interval of 250 ms, there are only four interrupts per second. This prepares the system to enter a lower power mode by reducing the number of times the processor is awoken. In other implementations, shorter or longer timer interrupts may be used.

In communication with the kernel are the device drivers. The device drivers update a reference counter in the kernel for clocks associated with the devices they manage. When a data transfer or other use of the device is anticipated, the device driver increments the reference counter. When no data transfer or other use is pending, the reference counter is decremented.

With the processor having an increased timer interrupt interval, and being in the idle mode, the kernel checks the reference counters corresponding to designated devices. These may include the reference counters for the smart direct memory access (SDMA), Universal Serial Bus (USB), image processing unit (IPU), external memory interface (EMI), and so forth. If the reference counters are zero, no usage of those devices is anticipated, and the processor may proceed to enter quiescent doze mode (QDM). Otherwise, the processor may enter wait mode.

In the QDM, the kernel first gates the clocks of devices which rely on memory or memory transfers such as SDMA. Then, clocks present in a clock gating register (CGR) are gated. By way of example, clocks that may be present in the CGR in a processor of the i.MX family include: sd_mmc2, IIM, ATA, CSPI3, RNG, UART2, UART3, UART4, SSI2, I2C2, I2C3, HANTRO, MEMSTICK1, MEMSTICK2, SIM, ECT, KPP, 1-WIRE, GACC, MBX, RTIC, and FIR. Status of a wide area networking (WAN), local area networking (LAN), or other device utilizing the USB for communication with the processor are checked to determine if they are ON or OFF. When the status of this WAN or other USB connected device is "OFF" and not "ON", the USB and related clocks are gated. Next, any other clocks deemed unnecessary by the kernel may be gated, such as an IPU clock or watchdog clock. A command to gate or shutdown external peripheral devices, may be sent. Interrupts on the processor are then disabled, and the processor executes a wait for interrupt (WFI). Logic circuits remain powered, and the e-book reader is now in lower power QDM.

Upon receipt of an interrupt, reset, or other input specific to the processor used, the processor un-gates or enables clocks and interrupts. The processor is now awake and ready to execute the task which triggered the interrupt. When the processor returns to idle, the method may begin again.

While the overview describes the QDM in terms of an e-book reader, the concepts described herein may also be applicable to cellular telephones, portable media players, desktop computers, laptops, tablet computers, netbooks, servers, personal digital assistants, or other electronic devices.

Illustrative Method for Entering Quiescent Doze Mode (QDM)

Figure 1:
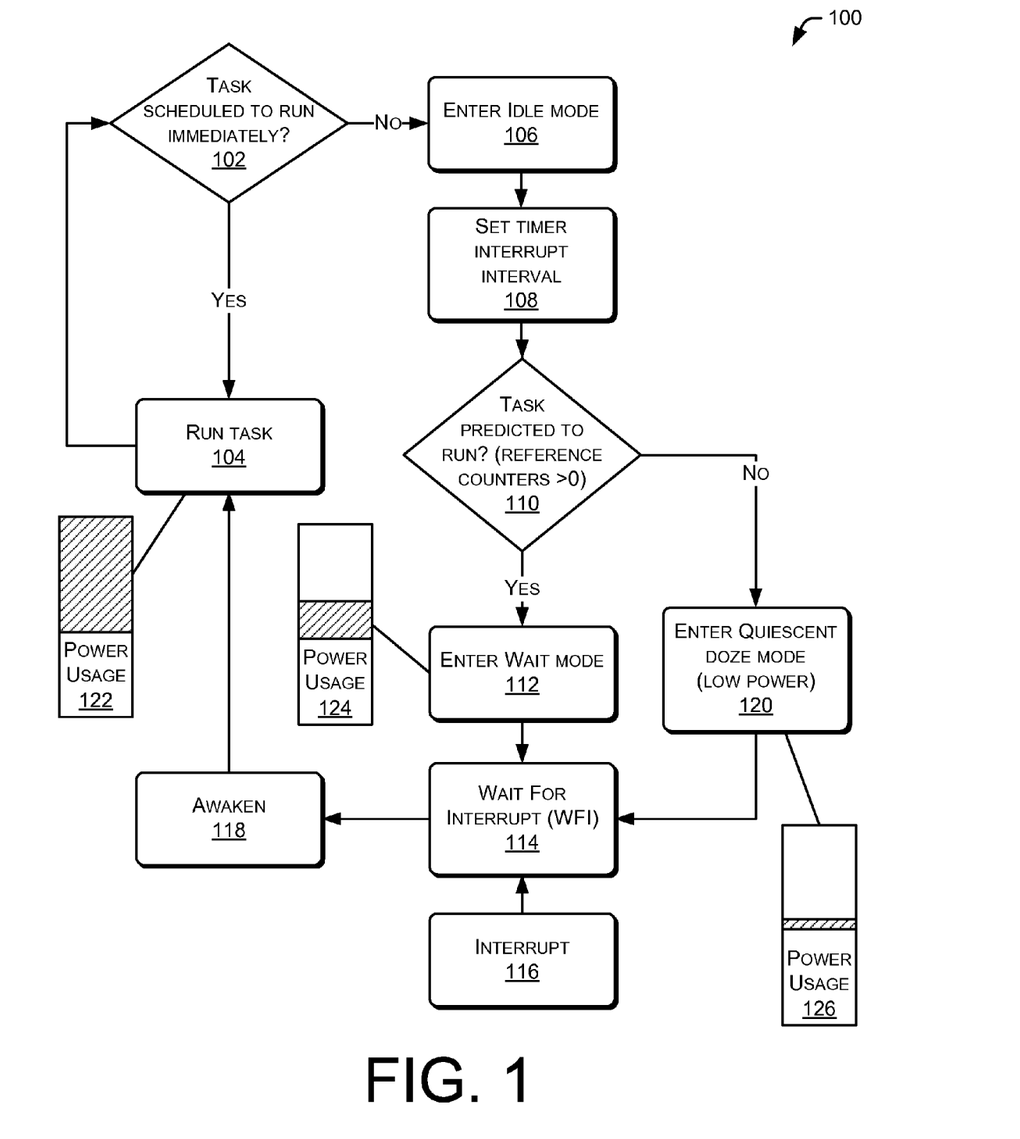
FIG. 1 is an illustrative flow diagram of a method for entering a low power "quiescent doze mode."

FIG. 1 is an illustrative flow diagram of a method 100 for entering a low power QDM on an electronic device. At 102, a kernel executing on a processor determines whether there are any tasks scheduled to run immediately. If a task is scheduled to run immediately, at 104, the scheduled task is run. When no tasks are scheduled to run immediately, at 106, the kernel instructs the processor to enter an idle mode.

At 108, the kernel dynamically sets a timer interrupt interval on the processor based on when the next task demands execution. This timer interrupt interval may vary from at least a minimum threshold for immediacy, such as about 5 milliseconds, to a value of at most about 1000 ms. In typical use, this method results in an average timer interrupt interval of about 250 ms which provides a good compromise between power consumption, heat generation, and user responsiveness in an e-book reader, and provides the processor with time to reach lower power modes. In this example, instead of the processor generating a timer interrupt every 10 ms (resulting in 100 interrupts per second), at an average of 250 ms, there are only four interrupts per second.

At 110, the kernel determines whether tasks are predicted to run that may affect devices coupled to the processor. The kernel may use reference counters to make this determination. In that case, the kernel communicates with device drivers, which in turn update the reference counters. When use or data transfer is pending, reference counters are incremented. When no use or data transfer is pending, reference counters are decremented. Updates to the reference counters are discussed in more depth in FIG. 2 below. FIG. 3 below details the determination made using these reference counters.

When a task is predicted to run or is in use, at 110, at 112, the reference counter will remain incremented and the processor may enter a wait mode. This wait mode may include stopping a clock(s) for the processor while leaving peripheral devices active. In conjunction with the extended timer interrupt interval 108, some power savings may be realized while in wait mode 112.

At 114, once in wait mode the processor executes a wait for interrupt (WFI). When an interrupt is received, at 116, the processor awakens, at 118. Awakening 118 enables clocks and interrupts. The processor is now awake and ready to run the task 104 which triggered the interrupt. Once the task is run, the system may return to 102 to determine if a task is scheduled to run.

Returning to determination 110, when a task is not predicted to run, the system may enter the QDM 120, which is a lower power state. The QDM is discussed in more depth with reference to FIG. 4 below. Once in the QDM 120, similar to above, the processor executes a wait for interrupt (WFI). When an interrupt 116 is received the processor awakens 118.

FIG. 1 also depicts power usage during the different modes for an illustrative e-book reader. At 122, power usage may be at a maximum while a task is running 104, such as drawing about 200 milliamperes (mA) while flipping pages. At 124, a power reduction of about 70% is indicated while in wait mode 112 when power usage drops to at least about 60 and at most about 70 mA. At 126 power consumption drops to about 17.4 mA, a power reduction of about 92% while in QDM compared to power usage 122 while flipping pages. When turning a wide area networking (WAN) module on or off, power usage may increase to about 400 mA, while accessing an online store may use about 250 mA.

Figure 2:
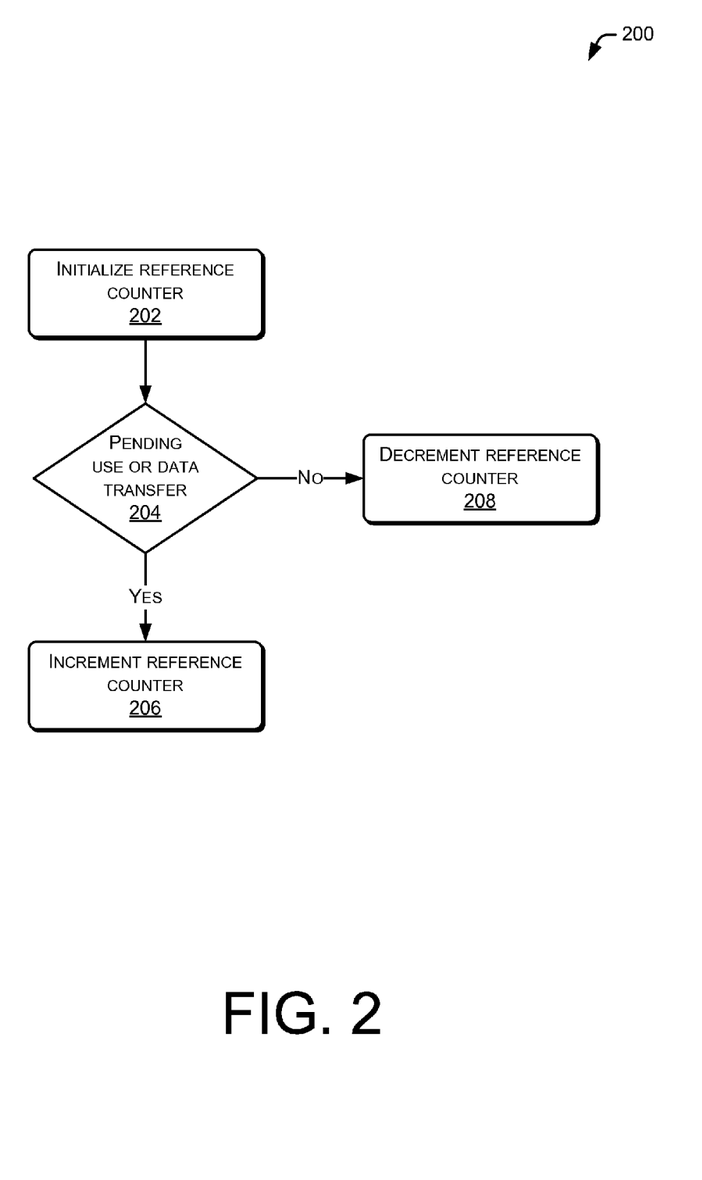
FIG. 2 is an illustrative flow diagram of a method for adjusting reference counters used by the method of FIG. 1.
Figure 3:
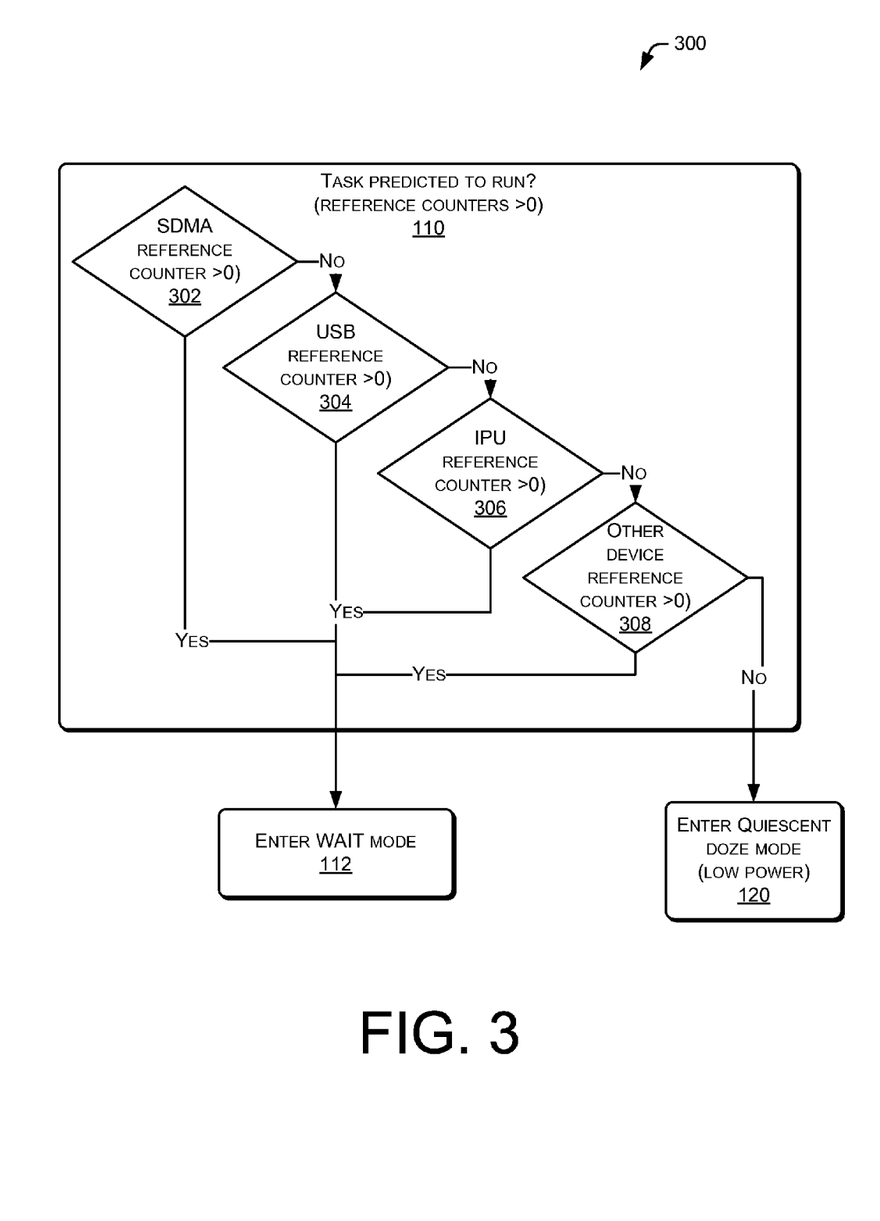
FIG. 3 is an illustrative flow diagram of predicting whether tasks will run using reference counters, for the method of FIG. 1.

FIG. 2 is an illustrative flow diagram of a method 200 for adjusting the reference counters used by the method of FIG. 1. At 202, the kernel initializes a reference counter. For example, with a Linux® kernel, the reference counter may be a clock structure such as struct clk. The usecount of the clock is a field in the structure of type "int." In the C programming language, code may look like:

struct clk *usb_clk;
    usb_clk=clk_get("usb_clk");
    usb_clk->usecount++; /* Increments means device using it */
    usb_clk->usecount--; /* Decrements means device not using it */

At 204, when the device driver determines use is impending, such as in the case where a device will be using SDMA to write to memory via the EMI, the reference counter is incremented at 206. When the device driver determines no use is impending, the reference counter is decremented at 208. Depending on the characteristics of the kernel, the reference counter may not be decremented below zero.

FIG. 3 is an illustrative flow diagram 300 of using reference counters to predict whether tasks will run, for the method of FIG. 1. As described with regards to FIG. 2, reference counters are incremented and decremented by the device drivers. The kernel looks to those reference counters, at 110, to determine whether a task is predicted to run.

At 302, a SDMA reference counter is tested and if greater than 0 (indicating predicted use), the processor will proceed, at 112, to enter the wait mode. At 304, if the SDMA reference counter 302 is 0, indicating no predicted use, a USB reference counter is tested and if greater than 0, the processor will proceed, at 112, to enter the wait mode.

At 306, if the USB reference counter 304 is 0, indicating no predicted use, an IPU reference counter is tested and if greater than 0, the processor will proceed, at 112, to enter the wait mode.

At 308, if the IPU reference counter 306 is 0, indicating no predicted use, another reference counter for a designated device may be tested and if greater than 0, the processor will proceed, at 112, to enter the wait mode. Otherwise, if the other device reference counter is 0, the processor will proceed to enter QDM 120.

The sequence and logical arrangement of this determination may be varied, and the above is only an illustration of one example. The number of specific reference counters relating to devices may be extended or reduced as desired.

Figure 4:
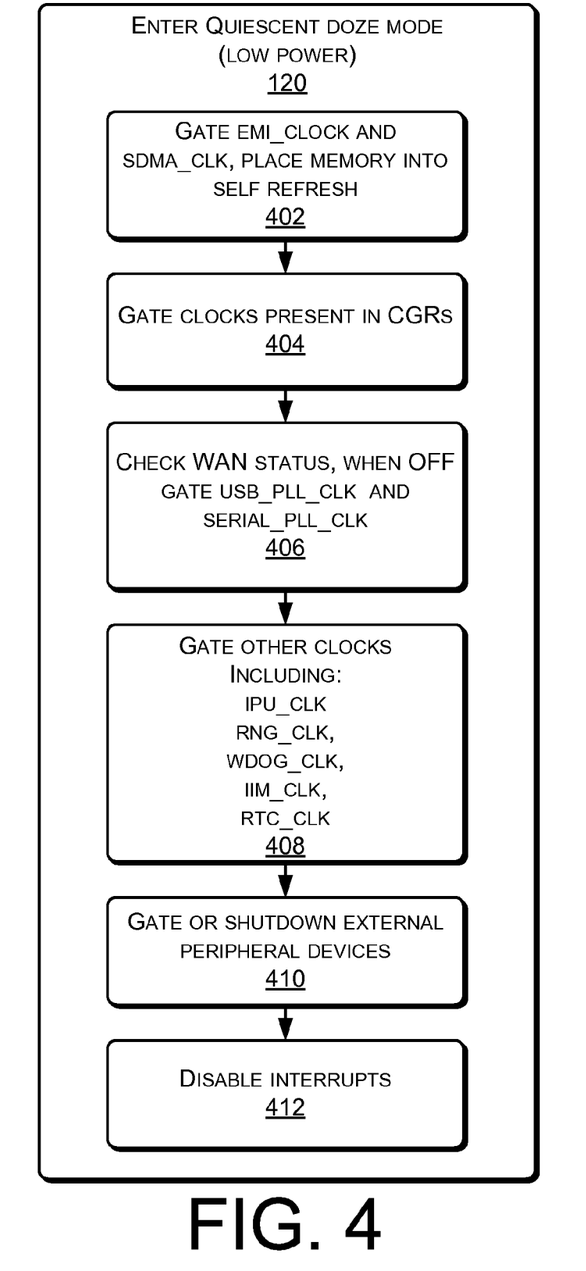
FIG. 4 is an illustrative flow diagram showing additional details of the method for entering the low power quiescent doze mode shown in FIG. 1.

FIG. 4 is an illustrative flow diagram of the method 120 for entering the low power QDM shown in FIG. 1. To achieve low latencies during awakening, logic circuits may remain powered while clocks are gated.

At 402, the EMI and SDMA clocks are gated. Memory coupled to these clocks are placed into self refresh, where the memory refreshes itself without external inputs. At 404, clocks present in the CGR are gated.

At 406, the status of a wide area networking (WAN), local area networking (LAN), or other device utilizing the USB for communication with the processor is checked. When the status of this WAN or other USB connected device is "OFF" and not "ON", the USB and related clocks are gated.

At 408, other clocks deemed unnecessary may be gated by the kernel. These may include the clocks for the IPU, watchdog, random number generator, RTC, and others. At 410, a command to gate or shutdown external peripheral devices, may be sent to the external peripheral device.

At 412, interrupts on the processor are disabled, and the processor is in QDM 120. The processor then executes a WFI 114 as described above.

Illustrative E-Book Reader

Figure 5:
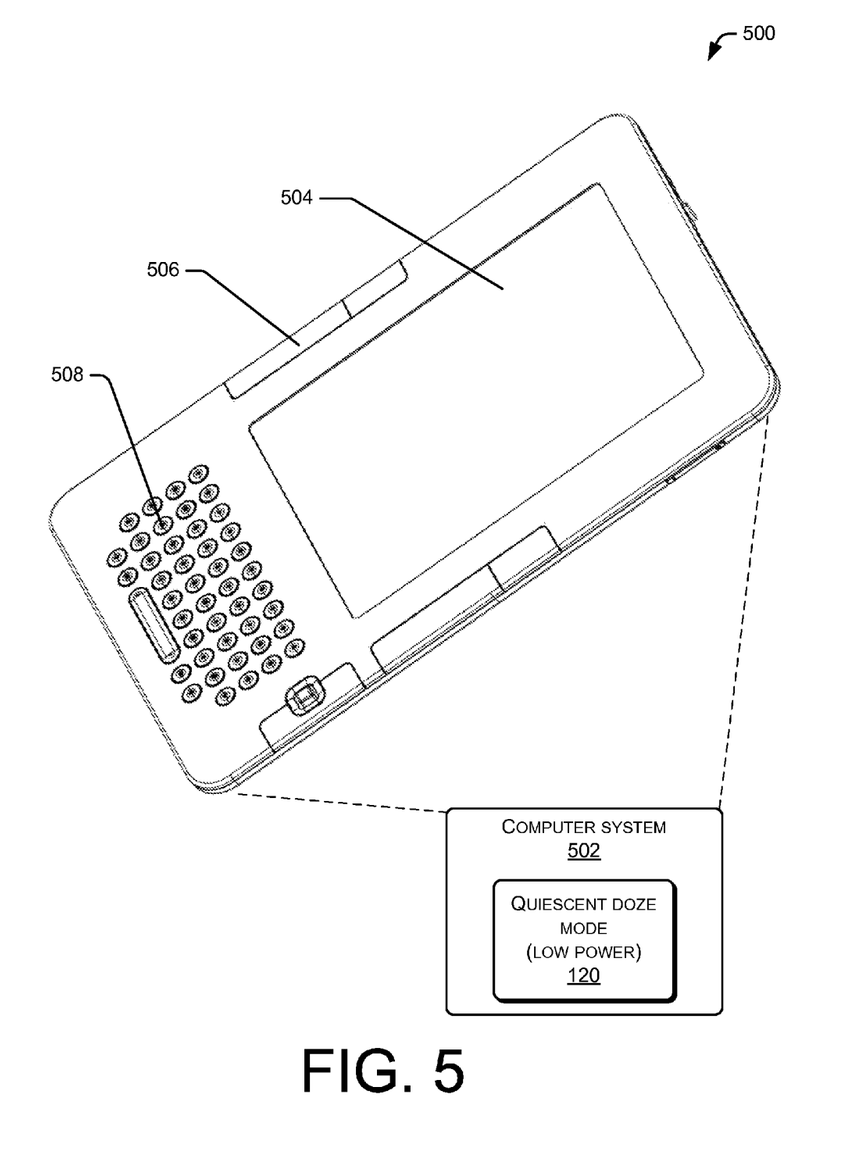
FIG. 5 is an illustrative e-book reader configured to enter the low power doze mode.

FIG. 5 is an illustrative e-book reader 500 capable of using a computer system 502 to implement the method of FIG. 1 for achieving low power quiescent doze mode (QDM) 120. The e-book reader may comprise a computer system 502 utilizing a QDM 120 to achieve low power operation during use. The e-book reader 500 may have a display 504, page turning buttons 506, and a keypad 508 for user input.

Figure 6:
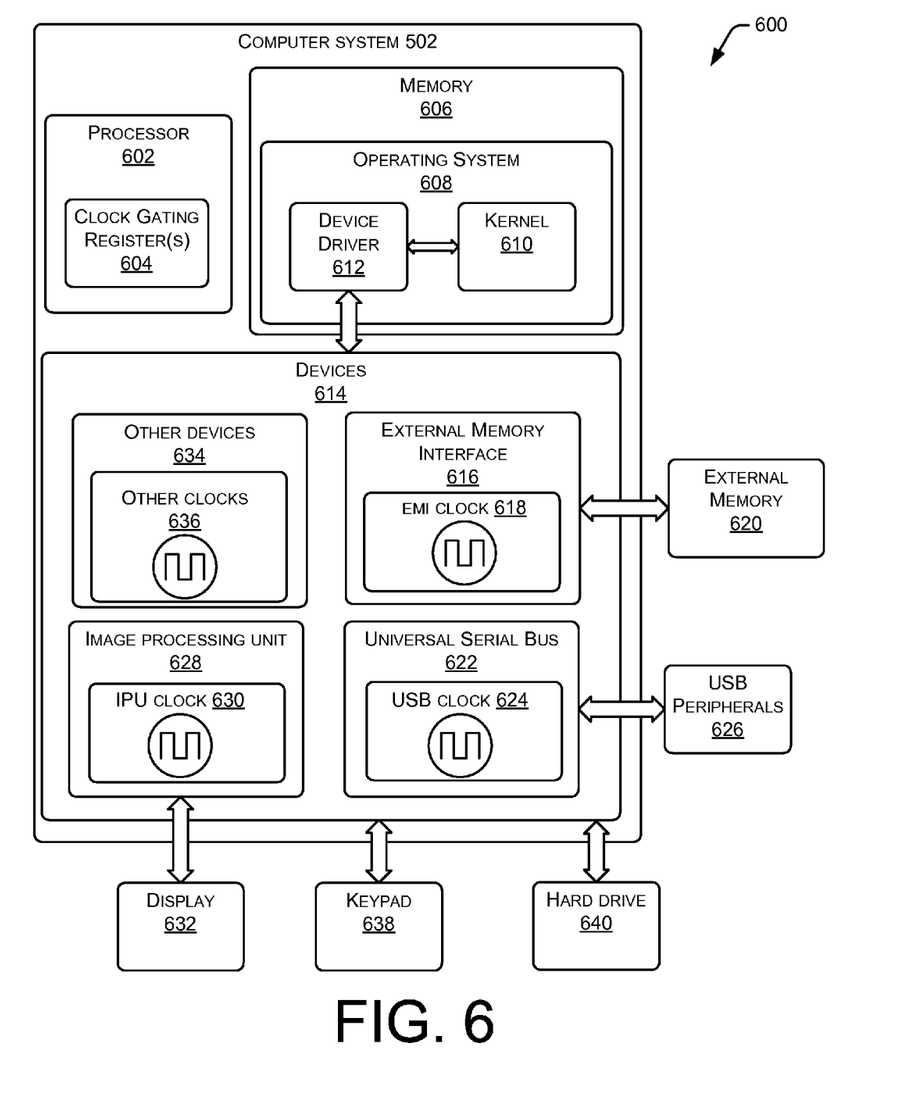
FIG. 6 is an illustrative schematic of a computer system configured to enter the low power doze mode.

FIG. 6 is an illustrative schematic 600 of the computer system 502 shown in FIG. 5.

While computer system 502 is shown in relation to an e-book reader, it is understood that a computer system may also be used in connection with cellular telephones, portable media players, desktop computers, laptops, tablet computers, netbooks, personal digital assistants, servers, and the like.

A processor 602, containing clock gating registers 604, is shown within computer system 502. Memory 606 within the computer system 502 may store an operating system 608 comprising a kernel 610 and a device driver 612 which are operatively coupled. Device driver 612 is operatively coupled to devices 614. Several illustrative devices in computer system 502 are described next.

An External Memory Interface (EMI) 616, which comprises an EMI clock 618, is present. EMI 616 may be coupled to external memory 620, which may comprise Static Random Access Memory (SRAM), Pseudostatic Random Access Memory (PSRAM), Synchronous Dynamic Random Access Memory (SDRAM), Double Data Rate SDRAM (DDR), NAND Flash, and the like.

A Universal Serial Bus (USB) controller device 622 having a USB clock 624 is shown, and may be coupled to USB peripherals 626. The controller device may comply with any of the USB standards including USB 1.0, 1.1, 2.0, and/or 3.0 as set forth by the USB Implementers Forum.

An image processing unit 628 with an IPU clock 630 is shown coupled to a display 632. For example, this may be display 504 on e-book reader 500 described above.

Other devices 634 may be present in the computer system with their respective other clocks 636. These other devices may include a firewire bus, camera, global positioning system, Bluetooth™, PC Card device, etc.

Computer system 502 may have a keypad 638 coupled thereto. For example, this may be keypad 508 on e-book reader 500 described above. Also shown is hard drive 640, which may either use magnetic or optical memory on spinning disks or solid state storage.

Operative couplings, such as that between kernel 610 and device driver 612 are shown for emphasis. All devices in FIG. 6 are operatively coupled, with their respective arrows omitted only for clarity of illustration. As described above, during QDM EMI clock 618, USB clock 624, IPU clock 630 and other clocks 636 including those present in the clock gating register 604, would be gated. A gating or shutdown command may also be sent to external devices, such as a USB peripheral 626. During awakening, these clocks would be un-gated.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method for placing an e-book reader into a low power mode, the method comprising:
   transitioning a processor from an active mode to an idle mode when no task is scheduled to execute on the processor;
   setting a timer interrupt interval based on when a next task is to be executed;
   adjusting a reference counter in a kernel executing on the processor, the adjusting comprising:
      incrementing the reference counter based on a device driver indicating that a device will be used within a predetermined time period, and
      decrementing the reference counter in the kernel based on the device driver indicating that the device will not be used within the predetermined time period;
   entering a wait mode during the timer interrupt interval when the reference counter is greater than zero, the wait mode comprising stopping a clock for the processor while leaving the device active;
   entering a quiescent doze mode during the timer interrupt interval when the reference counter is zero, the quiescent doze mode including:

gating an external memory interface clock associated with an external memory interface that provides access to an external memory; and placing the external memory into self refresh; and waiting for an interrupt before resuming the active mode.

2. The method of claim 1, wherein the quiescent doze mode further comprises maintaining logic circuits in a powered state.

3. The method of claim 1, wherein the kernel comprises a Linux-based kernel.

4. The method of claim 1, wherein the quiescent doze mode further comprises gating at least one of the following:

a universal serial bus clock;

an image processing unit clock;

one or more clocks in a clock gating register;

a random number generator clock;

a watchdog clock;

a real-time clock; and a device identification clock.

5. A method comprising:

testing, during a timer interrupt interval, a reference counter corresponding to a device associated with a device driver in a kernel, the reference counter updated by the device driver based on at least one pending use of the device as determined by the device driver;

predicting an anticipated usage of the device based at least on the reference counter updated by the device driver; and instructing, during the timer interrupt interval, a processor to enter a quiescent doze mode when no anticipated usage of the device is predicted, the quiescent doze mode including:

placing an external memory into self refresh; and after placing the external memory into self refresh, gating or shutting down one or more devices external to the processor.

6. The method of claim 5, further comprising executing a wait for interrupt after placing the external memory into self refresh.

7. The method of claim 5, further comprising setting a processor timer interrupt interval to occur on demand.

8. The method of claim 5, further comprising setting a processor timer interrupt interval dynamically to when the next task is to be executed.

9. The method of claim 8, wherein the processor timer interrupt interval is at least 5 ms and at most 1000 ms.

10. The method of claim 8, wherein the processor timer interrupt interval is at least 5 ms and at most 250 mc.

11. The method of claim 5, wherein the predicted anticipated usage information further comprises testing at least a second reference counter for a second device.

12. The method of claim 5, wherein the quiescent doze mode further comprises:

gating at least one of the following:

a smart directory memory access dock;

a universal serial bus clock;

an image processing unit clock; and an external memory interface clock;

disabling processor generated interrupts; and waiting for an interrupt before resuming an active mode.

13. The method of claim 5, wherein the quiescent doze mode further comprises gating a smart direct memory access clock and placing the external memory into self refresh.

14. A system for reducing power consumption in a portable electronic device, the system comprising:

memory;

a processor couple to the memory;

a peripheral device coupled to the processor:

a device driver stored in memory coupled with the peripheral device, the device driver being configured to execute on the processor and to increment a reference counter when the peripheral device is scheduled to be utilized or decrement the reference counter when the peripheral device is not scheduled to be utilized; and a kernel stored in the memory and configured to execute on the processor, the kernel being configured to communicate with the device driver, and when the processor is idle and the device driver reference counter is greater than zero, to place the processor into a wait mode, the wait mode comprising stopping a clock for the processor while leaving the peripheral device active, and when the processor is idle and the device driver reference counter is zero, to place the processor and the peripheral device into a quiescent doze mode, the quiescent doze mode including:

placing an external memory into self refresh; and after placing the external memory into self refresh, gating or shutting down one or more devices external to the processor.

15. The system of claim 14, further comprising a timer interrupt in the processor configured to send one or more interrupts on demand.

16. The system of claim 14, further comprising a timer interrupt interval in the processor configured to be dynamically adjusted based on when a next task is to be executed.

17. The system of claim 14, wherein the quiescent doze mode further comprises:

gating at least one of the following:

a smart direct memory access clock;

a universal serial bus clock;

an image processing unit clock; and an external memory interface clock;

disabling processor generated interrupts; and waiting for an interrupt before resuming an active mode.

18. One or more non-transitory computer-readable storage media comprising:

a device driver configured to update a reference counter for a device based on a determination of when the device is not expected to be utilized; and a kernel configured to:

interrogate the reference counter set a timer interrupt interval on a processor to when the next task is to be executed; and enter a quiescent doze mode during the timer interrupt interval when, based on the interrogation, the device is not expected to be utilized, the quiescent doze mode including:

gating an external memory interface clock associated with an external memory interface that provides access to an external memory; and placing the external memory into self refresh.

19. The one or more non-transitory computer-readable storage media of claim 18, wherein the kernel is further configured, in the quiescent doze mode, to gate all unused system clocks, disable interrupts and enter a wait for interrupt state.

20. The method of claim 1, further comprising entering a wait mode when the reference counter is greater than zero, the wait mode including stopping a clock associated with the processor while leaving one or more devices active; and waiting for an interrupt before resuming the active mode.

* * * * *